US005338779A

United States Patent [19]

Brazelton

[11] Patent Number: 5,338,779

[45] Date of Patent: Aug. 16, 1994

[54] DRY POLYMER ACTIVATION APPARATUS AND METHOD

[75] Inventor: Carl L. Brazelton, Kankakee, Ill.

[73] Assignee: Stranco, Inc, Bradley, Ill.

[21] Appl. No.: 946,915

[22] Filed: Sep. 18, 1992

[51] Int. Cl.[5] .............................. C08J 3/02; C08J 3/05

[52] U.S. Cl. .................................... 523/313; 523/318; 523/322; 523/324; 528/499; 422/229; 422/259; 422/275; 422/901; 366/155; 366/182; 366/262; 366/270; 366/305; 366/306

[58] Field of Search ............... 523/313, 318, 322, 324; 528/499; 422/901, 229, 275; 366/182, 262, 305, 306, 270, 155

[56] References Cited

U.S. PATENT DOCUMENTS

| | | | |
|---|---|---|---|
| T896,051 | 3/1972 | Hamlin et al. | 260/29.2 |
| 2,008,684 | 7/1935 | Craddock | 259/97 |
| 2,212,260 | 8/1940 | Brothman | 259/107 |
| 2,249,263 | 7/1941 | Wheelwright, Jr. | 259/6 |
| 2,268,461 | 12/1941 | Nichols | 259/9 |
| 2,556,014 | 6/1951 | Tolman | 259/21 |
| 2,651,582 | 9/1953 | Courtney | 106/167 |
| 2,686,110 | 8/1954 | Carver | 23/285 |
| 2,740,696 | 4/1956 | Longwell | 23/252 |
| 3,252,689 | 5/1966 | Blomgren, Sr. et al. | 259/8 |
| 3,319,937 | 5/1967 | Wilson et al. | 259/8 |
| 3,389,970 | 6/1968 | Scheibel | 23/270.5 |
| 3,536,646 | 10/1970 | Hatch et al. | 260/29.2 |
| 3,559,959 | 2/1971 | Davis et al. | 259/66 |
| 3,742,735 | 7/1973 | Verreyne et al. | 68/5 D |
| 3,747,899 | 7/1973 | Latinen | 259/9 |
| 3,756,570 | 9/1973 | Buhner | 259/6 |
| 3,852,234 | 12/1974 | Venema | 260/29.6 |
| 4,113,688 | 9/1978 | Pearson | 260/29.6 |
| 4,125,574 | 11/1978 | Kastner et al. | 526/345 |
| 4,171,166 | 10/1979 | Trowbridge et al. | 366/316 |
| 4,217,145 | 8/1980 | Gaddis | 106/170 |
| 4,218,147 | 8/1980 | Rosenberger | 366/162 |
| 4,233,265 | 11/1980 | Gasper | 422/135 |
| 4,243,636 | 1/1981 | Shiraki et al. | 137/3 |
| 4,433,701 | 2/1984 | Cox et al. | 210/192 |
| 4,470,907 | 9/1984 | Sencza | 366/160 |
| 4,522,502 | 6/1985 | Brazelton et al. | 366/142 |
| 4,664,528 | 5/1987 | Rodgers et al. | 366/336 |
| 4,701,055 | 10/1987 | Anderson . | |
| 4,719,252 | 1/1989 | Dutton et al. | 523/318 |
| 5,018,871 | 5/1991 | Brazelton et al. | 366/168 |
| 5,135,968 | 8/1991 | Brazelton et al. | 523/313 |
| 5,164,429 | 11/1992 | Brazelton et al. | 523/313 |

FOREIGN PATENT DOCUMENTS

| | | |
|---|---|---|
| 0157740 | 2/1988 | European Pat. Off. . |
| 80951 | 1/1979 | Luxembourg . |

OTHER PUBLICATIONS

Yong H. Kim, "On The Activation Of Polymeric Flocculants" Stranco, Inc. published Apr. 1989.

*Primary Examiner*—Paul R. Michl
*Assistant Examiner*—Andrew E. C. Merriam
*Attorney, Agent, or Firm*—Welsh & Katz, Ltd.

[57] ABSTRACT

Polymer activation apparatus for activating a batch of dry polymer in dilution water includes a tank which contains the dilution water in a mixing vessel and a mixing assembly within the mixing vessel. The dilution water is circulated at a high rate through the mixing assembly to create a high shear flow condition within the mixing assembly. The polymer is introduced into the mixing assembly to disperse the polymer in the dilution water and form a slurry in the vessel without causing agglomeration of the dry polymer. After dispersion and before hydration of the polymer, the rate of circulation through the mixing assembly is reduced to create a low shear flow condition. The low shear condition is maintained as the viscosity of the solution increases.

18 Claims, 4 Drawing Sheets

DRY POLYMER ACTIVATION APPARATUS AND METHOD

BACKGROUND OF THE INVENTION

This invention relates generally to a method and apparatus which mixes a polymeric flocculent in dilution water and activates the polymer for liquid/solid separation and more particularly to a polymer activation and dilution method and apparatus which activates a batch of dry polymer in a dilution chamber, without damaging the polymer structures excessively, to produce a polymer for particular use in the treatment of water.

Flocculent and coagulants such as polyelectrolyte materials, polymers, gums and the like ("polymers") are commonly used in water treatment equipment in order to remove solids suspended in the water. Polymers are high molecular weight materials with millions of charge sites that attract the suspended particles. However, for a polymer to perform properly, the polymer must extend or untangle in dilution water. A polymer so extended is defined as being fully activated.

As disclosed in patent application Ser. No. 07/370,375 incorporated herein by reference, optimum activation of a polymer in dilution water requires a solution of dispersed polymer and dilution water to be subjected to a high shear rate agitation for a relatively short contact time to initiate activation and dissolution of the polymer. However, as the polymer begins to dissolve in the dilution water, the polymer molecules become more susceptible to physical damage from the high shear mixing. Therefore to further the dissolution and speed the activation process, the polymer solution is then subjected to a lower energy or low shear rate mixing for a longer period of time.

Polymers may be supplied in many different forms. One of the forms, a dry polymer such as a dry synthetic polyelectrolyte for example, is very difficult to properly activate. Unless a dry polymer is almost immediately dispersed into the dilution water when the polymer first comes into contact with the water, the tangled polymer molecules tend to attract each other, resulting in the formation of large clumps or agglomerations of polymer particles. Once formed these agglomerations are difficult to activate and are ineffective in liquid solid separation.

Prior art systems which are used to activate dry polymers typically rely on a continuous two step procedure consisting of a high shear dispersion followed by low shear mixing. The high shear dispersion is generally accomplished by combining dry polymer and a small amount of dilution water either a dynamic or jet mixer to form a slurry of dispersed polymer particles in dilution water. The slurry is then transported to a separate low shear mixer typically by a pressurized conduit. In the low shear mixer, tightly controlled flow amounts of the slurry and additional dilution water are mixed to achieve the desired solution concentration.

One of the drawbacks of this type of activation system is the large amount of capital investment required for the equipment and instrumentation needed for these systems. If a small amount of activated polymer is needed, such as in the treatment of potable water, these systems are uneconomic.

Another drawback is that the static mixers rely on a constant dilution water pressure and flow rate. In many locations, the water supply system cannot provide the needed constant water pressure and flow rate.

To provide for the small volume applications, a polymeric emulsion containing dispersed polymer particles may be used. However, polymer emulsions contain a hydrocarbon oil continuous phase making up about 50% of the total volume; and therefore, can only be applied in very small doses. Also, due to the health concerns, polymer emulsions require lengthy regulatory approval. Finally polymer emulsions have a limited shelf life and in remote locations this limited shelf life undesirable.

It is therefore an object of the present invention to provide an apparatus which can economically activate a small volume of dry polymer. A related object is to provide an apparatus for small volume applications which does not require the use of a polymer emulsion.

Another object of the present invention is to provide a method and apparatus for dry polymer activation which does not rely on a constant dilution water pressure and flow rate to function properly.

SUMMARY OF THE INVENTION

In keeping with one aspect of this invention, a polymer activation method is disclosed for activating a batch of dry polymer within a mixing vessel. The method includes supplying water to the mixing vessel and circulating the water through a mixing assembly within the vessel of a high rate with the circulation producing a high shear condition with the mixing assembly; introducing a batch of dry polymer into the mixing assembly to form a slurry in the vessel without significant agglomeration of the polymer; and reducing the rate of circulation in the vessel after the dry polymer has been dispersed into the slurry mixture and before substantial hydration has occurred.

The method further includes circulating the mixture through the mixing assembly to create a low shear flow and maintaining the low shear flow as the viscosity of the solution increases, in order to fully activate the dry polymer without excessively damaging the polymer structures.

The invention can be practiced in an apparatus which includes a tank defining the mixing vessel and the mixing assembly. The mixing assembly has a tube assembly in fluid communication with an impeller. Placing the tube assembly in a dispersion configuration and rotating the impeller at a high rate of speed produces the high shear circulation. Placing the tube assembly in a mixing configuration and rotating the impeller at a lower rate of speed produces the low shear circulation.

DETAILED DESCRIPTION

Figure 1:
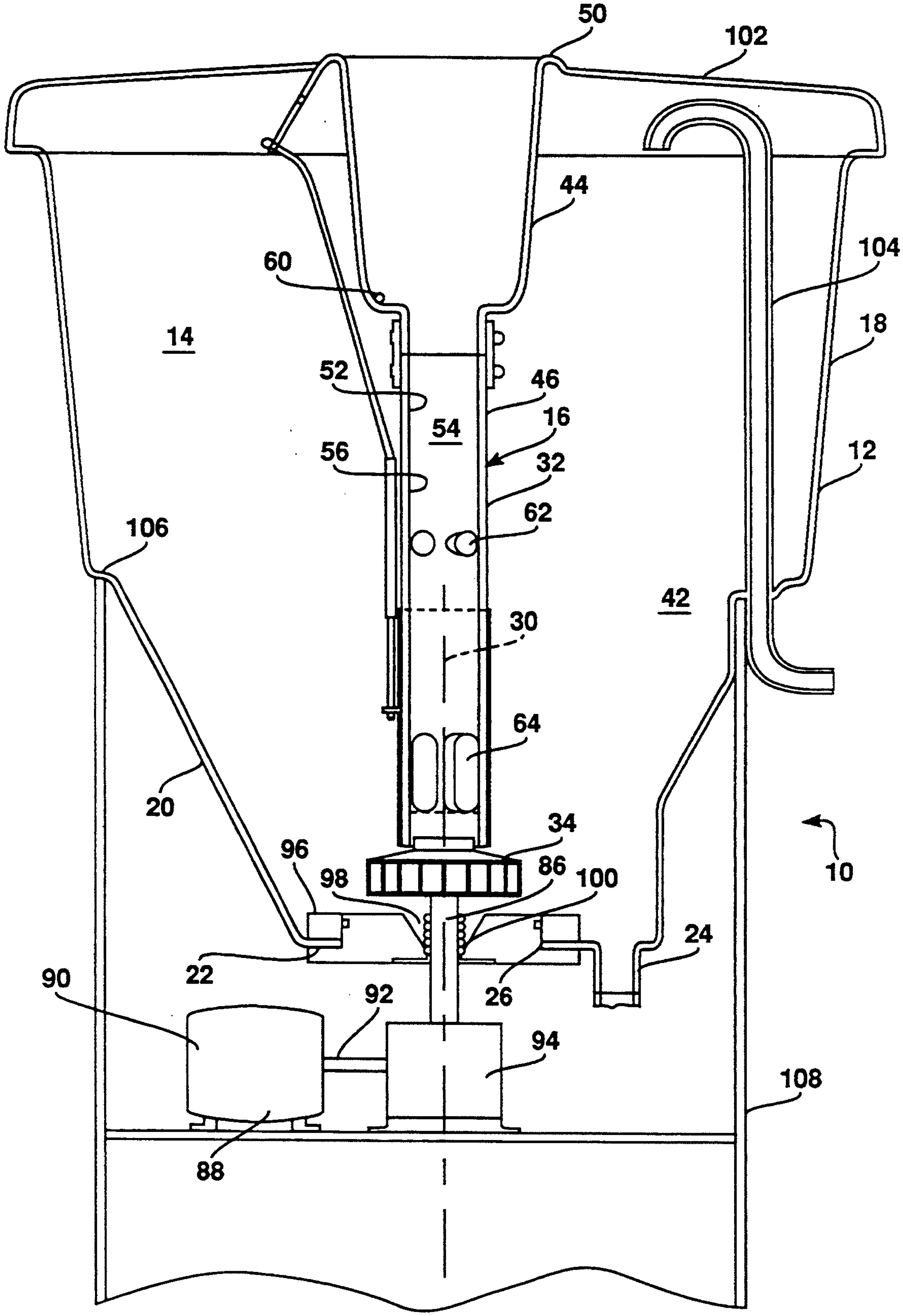
Fig. 1 is a longitudinal sectional view through the general center of an activation apparatus of the present invention with cross hatching removed for clarity.

FIG. 1 illustrates a polymer activation apparatus 10 constructed in accordance with the present invention for performing the method of this invention. The apparatus includes a tank 12 defining a mixing vessel 14.

Dilution water is supplied to the mixing vessel. A mixing assembly 16 within the chamber 14 first produces a circulation in the dilution water which creates a highly turbulent high shear condition within the mixing assembly. A batch of dry polymer is introduced into the mixing assembly 16 and the high shear condition disperses the polymer to form a slurry in the vessel before significant agglomeration of the polymer occurs.

The mixing assembly 16 then produces a circulation in the mixture which produces a low shear flow and dissolves the dispersed polymer into the dilution water forming a solution. As the viscosity of the solution increases, the mixing assembly maintains the low shear flow to fully activate the dry polymer without excessively damaging the polymer structures.

The tank 12 has an upper portion 18 with a square horizontal cross-section which is integrally joined to a lower frusto-conical portion 20 with a circular horizontal cross-section. The lower portion 20 includes a bottom wall 22 having a downwardly depending conduit 24 which defines a solution output for the tank 12. The output conduit 24 may be connected by a hose or other pipe (not shown) to a dosage pump or to a transfer pump for conveyance to a holding tank. The bottom wall 20 also defines a circular aperture 26. The tank 12 is preferably made of a strong lightweight corrosion resistant material such as glass fiber reinforced polyester resin.

Figure 2:
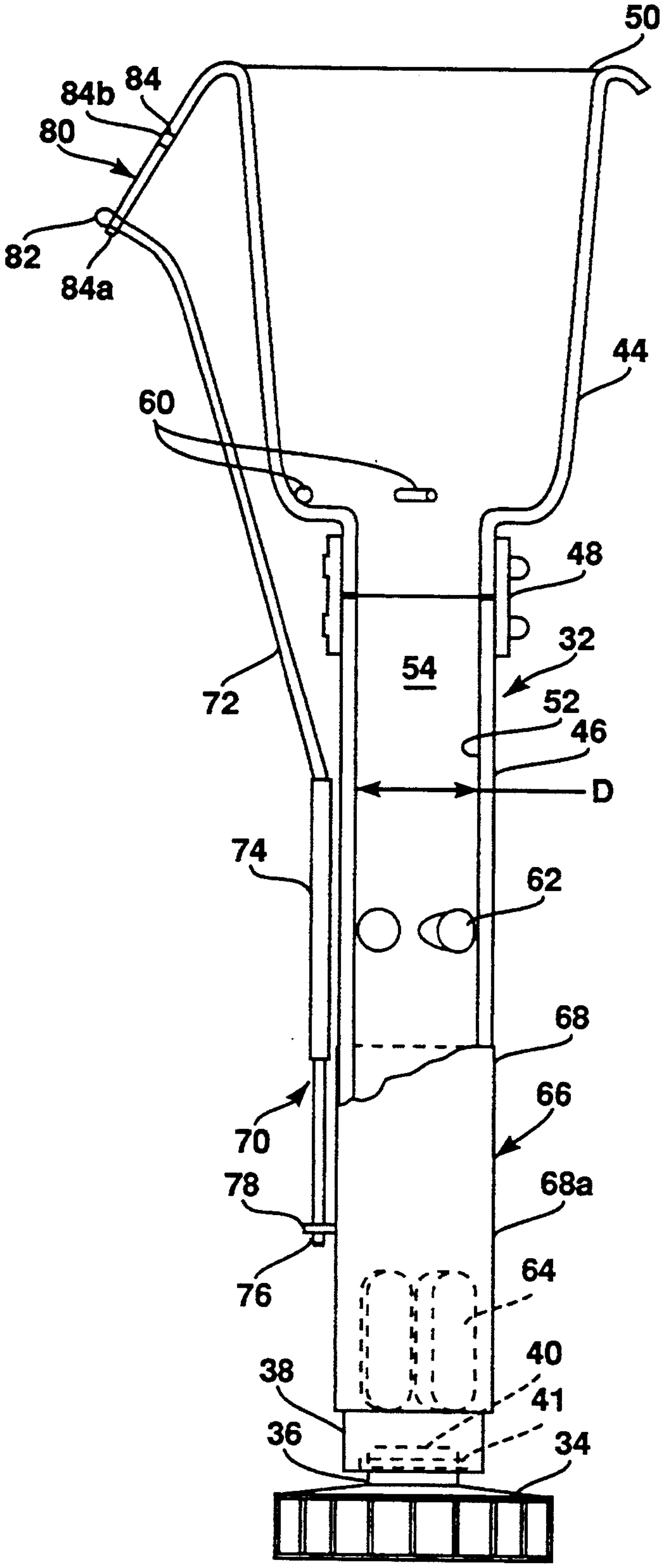
FIG. 2 is a longitudinal view with parts removed of a mixing assembly for use in the activation apparatus of FIG. 1.

The mixing assembly 16 extends downward along a central vertical axis 30 within the tank 12. Referring to FIG. 2, the mixing assembly 16 includes a center tube assembly 32 which is axially aligned with an impeller 34. The impeller 34 includes an eye extension 36 which extends into a lower end 38 of the tube assembly 32 to provide fluid communication between the tube assembly and an inlet eye 40 of the impeller 34. The lower end 38 may have a low friction annular bushing 41 to provide stability between the rotating eye extension 36 and the stationary tube assembly 32. The tube assembly 32, in combination with the tank 12, defines an outer chamber portion 42 of the mixing vessel 14 (FIG. 1).

The tube assembly 32 includes a larger diameter upper bowl section 44 and a generally cylindrical lower tube section 46. The bowl 44 may extend for about ⅓ the length of the tube assembly 32. To facilitate manufacture, the bowl may have a slight outward taper with a horizontal partition at the bottom of the bowl section where it reduces diameter to mate with the lower tube section 46 at the horizontal partition. The bowl section 44 and the tube section 46 are connected by a tube connector 48. The bowl 44 includes an open upper end 50 which defines a polymer inlet for the mixing vessel 14.

The inner surface 52 of the tube assembly 32 defines an inlet chamber portion 54 of the mixing vessel 14. The tube section has an inner diameter D and a generally cylindrical horizontal cross-section.

To vary the flow path area into the inlet chamber 54, the tube assembly 32 defines three sets of orifices having different cross-sectional areas. The three sets of orifices define flow paths between the inlet chamber 54 and outer chamber 42. The first set of orifices or rinsing ports 60 is arrayed around the circumference of the bowl 44 in close proximity to the tube 46. Each of the rinsing ports 60 is angled so that fluid flowing into the inlet chamber 54 through the port is discharged substantially tangent to the inner surface of the bowl 44 to form a rotation of fluid within the inlet chamber 54 which corresponds to the rotational direction of the impeller 34. To provide the preferred flow path area, the total cross-sectional area of all the rinsing ports 60 is approximately 10% of the cross-sectional area A of the tube 46.

The second set of ports or dispersion porte 62 are circumferentially arrayed about the tube 46 and located vertically from the lower end 38 of the tube assembly 32 by a distance equal to approximately 4 times the inner diameter D.

Each of the dispersion ports 62 is angled in a manner similar to that of the rinsing ports 60. Thus, fluid flowing from the outer chamber 42 through the dispersion ports 62 is discharged into the inlet chamber 54 to form a rotation of fluid corresponding to the rotational direction of the impeller 34. To discharge the fluid in the necessary direction, the thickness of the wall of the tube 46 is preferably approximately ⅓ the diameter of the ports 62. To provide the preferred flow path area, the total cross-sectional area of all the dispersion ports is approximately 30%–50% of the cross-sectional area of the tube 46.

The third set of ports or mixing ports 64 are circumferentially arrayed about the tube 46 and located vertically from the lower end 38 of the tube assembly 32 by a distance equal to approximately ½ times the inner diameter D.

Each of the mixing ports 64 is preferably angled in a manner similar to that of the dispersion ports 62 and rinsing ports 60 so that fluid flowing from the outer chamber 42 through the mixing ports is discharged into the inlet chamber 54 to form a rotation of fluid corresponding to the rotation of the impeller 34. To provide the preferred flow path area, the total cross-sectional area of all the mixing ports is equal to approximately the cross-sectional area of the tube 46. To enable the mixing ports 64 to have the necessary cross sectional area, the mixing ports may extend for a short vertical distance along the tube 46.

The mixing assembly 16 also includes a flow restricting device 66 which can be operated to selectively restrict the flow through the dispersion ports 62 and mixing ports 64. In the preferred embodiment, the flow restricting device 66 includes a generally cylindrical sleeve 68 which is dimensioned to allow the sleeve to slide vertically up and down the tube section 46. However, the sleeve 68 is also dimensioned to restrict fluid flow between the sleeve and the tube section 46. To prevent corrosion, the sleeve 68 may be made of stainless steel.

The height of the sleeve 68 is such that when the sleeve is placed in a dispersion position *68a*, the sleeve restricts fluid flow through the mixing ports 64 and the dispersion ports 62 are uncovered. When the sleeve 68 is placed in a mixing position *68b* (FIG. 4), the sleeve restricts the fluid flow through the dispersion ports 62 and the mixing ports 64 are uncovered.

To operatively control the vertical position of the sleeve 68 along the tube section 46, the flow restricting device 66 includes a sleeve control linkage 70. The sleeve control linkage 70 includes an elongated bar 72 which vertically extends roughly along the tube assembly 32. To provide stability to the bar 72, the bar passes through a retainer sleeve 74 which is rigidly attached to the tube section 46. The lower end 76 of the bar 72 is attached, preferably by bolted connection, to an eyelet 78 extending from the sliding sleeve 68 so that vertical movement of the bar will operate to cause vertical movement of the sleeve 68 along the tube section 46.

Sleeve control linkage 70 includes a positioning device 80 for selectively placing and retaining the sleeve 68 in either the dispersion position 68a or the mixing position 68b. In the preferred embodiment, the positioning device 80 includes a T-handle 82 which extends through a bracket 84 rigidly attached to the bowl 44. The bracket 84 is configured to define a lower slot 84a and an upper slot 84b. When the T-handle 82 is placed in the lower slot 84a, the sleeve 68 is placed and retained in the dispersion position 68a. When the T-handle 82 is placed in the upper slot 84b, the sleeve 68 is placed and retained in the mixing position 68b.

The impeller 34 is preferably an impeller of the type commonly used in centrifugal pumps. The vertical spacing between the upper flange and lower flange of the impeller 34 is wide relative to the impeller diameter as would be typical of an impeller in a centrifugal pump intended for high volume/low head pumping service.

Referring to FIG. 1, the impeller 34 is attached to and driven by a rotary shaft 86 in preferably a counterclockwise rotation when viewed from above. The rotary shaft 86 extends through the bottom wall of the tank and may be rotated by any suitable mechanism sized and designed so that the rotary shaft may be driven at variable rotational speeds ranging from about 3500 to about 500 rpm. Such a rotary drive mechanism 88 may include a motor 90. The motor 90 has a rotating shaft 92 which is operatively connected to the rotary shaft 86 by a transmission 94 so that operation of the motor 90 causes the rotary shaft 86 and impeller 34 to rotate.

A seal housing 96 provides a seal between the rotary shaft 86 and the tank 12. The housing 96 is disposed within the circular aperture 26 and defines a seal chamber 98. Circumscribing the rotary shaft 86 within the seal chamber 98 is a sealing mechanism such as a mechanical seal 100.

A covering lid 102 is configured to sit atop the upper rim of the tank 12. To position the mixing assembly 16 in a fixed relationship to the tank 12, the upper end 50 of the bowl 44 is preferably integrally molded with the covering lid 102. The covering lid 102 and tube assembly 32 are preferably made of a light corrosion resistant material such as a glass fiber reinforced polyester resin.

To provide dilution water to the mixing vessel 14, the tank 12 may include a vertical tube 104 which extends upward into the mixing vessel 14 through a radially extending lip 106 formed in the tank 12, preferably between the upper portion 18 and lower portion 20 of the tank. The upper end of the water inlet tube may be configured so that water discharged from the tube 104 is directed downward. Water could also be provided by other means including a hose which extends into the tank 12.

To support the tank 12 in an upright position, a glass fiber reinforced polyester resin support stand 108 may be provided. The stand 108 may be configured to contact and support the tank 12 about the circumference of the tank along the radially extending lip 106. Also, the support stand 108 may be configured to fixedly retain the motor 90 and transmission 94.

In operation, a valve (not shown) is actuated to supply dilution water through the water inlet tube 104 into the mixing vessel 14 to fill the vessel. When the dilution water in the mixing vessel 14 reaches a predetermined level, the water flow is shut off. The predetermined level is preferably 2 to 3 inches above the rinsing ports 60 in the interface bowl 44. Because the rate of flow of dilution water into the mixing vessel 14 is not critical, operation of the polymer activation apparatus 10 is unaffected by changes in the pressure or flow rate of the dilution water feed.

Figure 3:
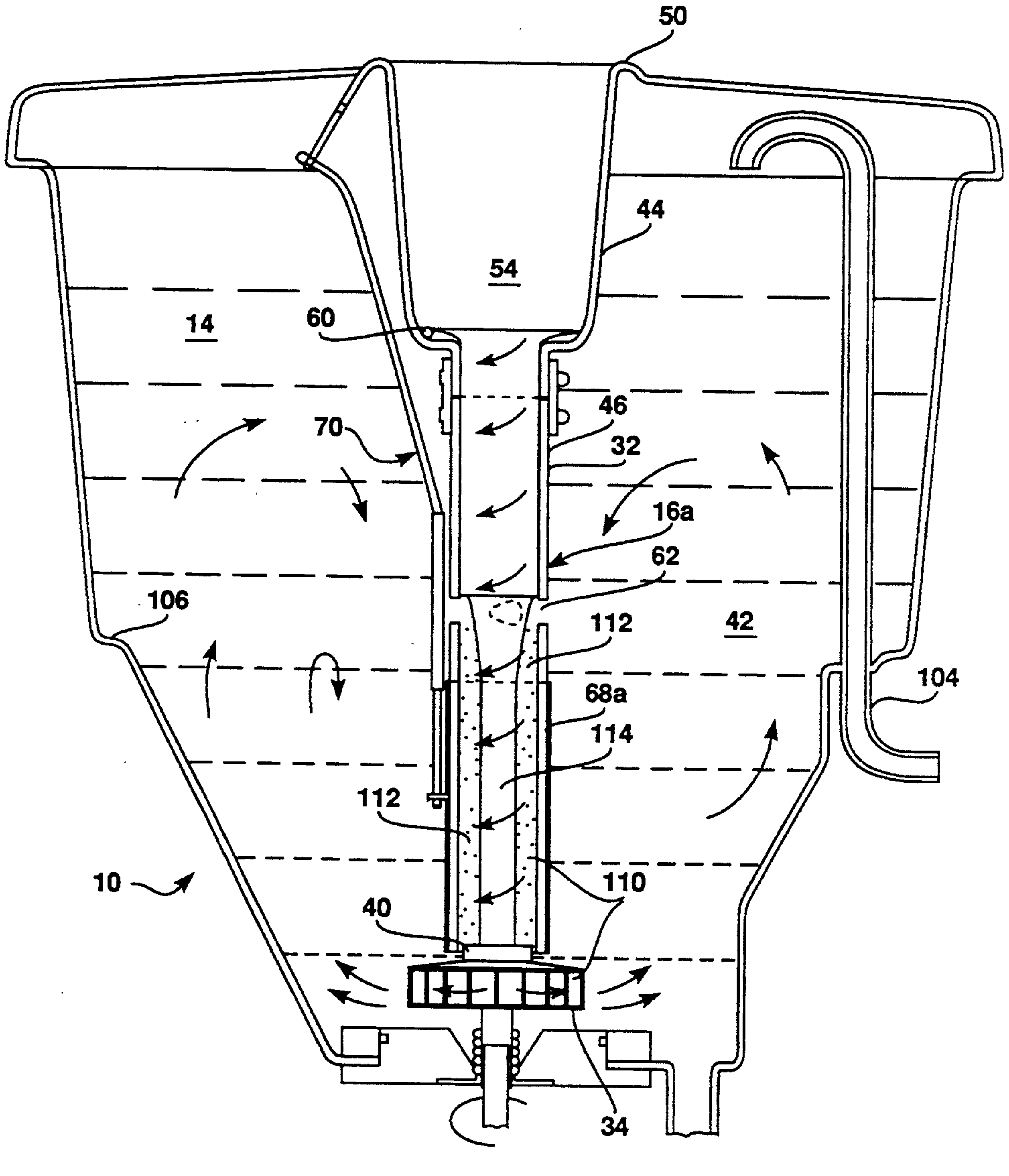
FIGS. 3 and 4 are diagrammatic representations of the fluid mixing mechanics in the activation apparatus of FIG. 1.

Referring to FIG. 3, the mixing assembly 16 is placed in a dispersion configuration 16a by positioning sleeve 68 in dispersion position 68a with the sleeve control linkage 70. The mixing ports 64 are now covered and the dispersion ports 62 are opened. The rotary drive mechanism 88 (FIG. 1) is actuated to rotate the impeller 34 at a high speed with the preferred rotation rate being approximately 3000 revolutions per minute.

As the impeller 34 rotates, the impeller rapidly transfers dilution water from the inlet chamber 54 into the outer chamber 42. Dilution water in the outer chamber 42 then flows into the inlet chamber 54 through the rinsing ports 60 and dispersion ports 62. Because the dispersion ports 62 discharge the dilution water at an angle, the dilution water forms a vortex 112 as the water moves through the tube assembly 32 and into the impeller 34. Water discharged into the inlet chamber 54 from the rinsing ports 60 will form a rinsing action in the lower part of the bowl 44 and upper part of the tube 46.

The flowing of water from the outer chamber 42 into the tube assembly 32, the vortex movement of the water through the tube assembly and the rapid transfer of water from the tube assembly to the outer chamber 42 circulates water through the mixing assembly 16 at a high rate. This circulation of dilution water causes turbulence in the dilution water in the mixing vessel 14. In addition, the vortex movement of dilution water through the tube assembly 32 and transfer of water through the rapidly rotating impeller 34 creates a high shear zone 110 having a high mixing energy both within the tube assembly and impeller and in close proximity to the impeller.

The cross-sectional flow path area of the rinsing ports 60 and dispersion ports 62 restricts the flow rate of water into the tube assembly 32 causing the flow to be less than the pumping capacity of the rotating impeller 34. Therefore, the vortex 112 forms a centralized air passageway 114 which extends downward near the inlet eye 40 of the impeller 34 so that any polymer contacting the dilution water before the inlet eye is quickly drawn into the impeller. In the preferred embodiment, the air passageway 114 extends into the inlet eye 40. Air is drawn into the impeller 34 through the passageway 114 and ejected as bubbles into the outer chamber 42.

A measured batch of dry polymer is fed into the inlet chamber 54 of the mixing assembly 16 by introducing the polymer through the upper end 50 of the bowl 44. Introducing can be done by any desired method such as manually with a scoop or automatically such as with a volumetric feeder. The feed rate of polymer should be relatively high to prevent the earliest fed polymer from being exposed to the turbulence in the mixing vessel 14 for a substantially longer time than the last fed polymer. The preferred feed rate of polymer is approximately 10 pounds a minute. The time period of feeding the dry polymer will typically be approximately 20 to 40 seconds.

As the dry polymer enters the inlet chamber 54, a portion of the dry polymer is transported or directed by gravity and the flowing air down the air passageway 114 and into the inlet eye 40. In the impeller 34, the dry polymer comes into contact with the dilution water in the high shear zone 110.

A remaining portion of dry polymer comes into contact with and is entrained in the vortex 112. If any polymer contacts the bottom of the bowl 44 or tube 46 above the vortex 112, the rinsing action of the rinsing ports 60 washes the polymer into the vortex 112. The vortex 112 transports or directs the entrained polymer down the inlet chamber 80 and into the inlet eye 40 very quickly. Thus in the vortex 112, the polymer comes into contact with the dilution water in the high shear zone 110.

As the polymer and dilution water travel through the mixing assembly 16 and into the outer chamber 42, the high shear zone 110 subjects the polymer and dilution water solution to the high mixing energy which disperses the polymer into the dilution water to form a slurry mixture. After the polymer and dilution water is transferred into the outer chamber 42, the high turbulence in the mixing vessel 14 initiates activation of the polymer in the dilution water.

After completion of the feeding of the dry polymer, the impeller 34 continues to rotate at the high speed for a period of time to maintain the turbulence until the polymer particles are fully dispersed and before substantial hydration of the particles occurs. Before substantial hydration occurs, the polymer particles may be recirculated through the mixing assembly 16 without damage to the particles. Once the polymer particles begin to substantially hydrate, further exposure to the high shear flow will damage the polymer molecules. The time period required to fully disperse and wet the dry polymer before the particles begin to substantially hydrate is dependent on the dilution water quality and temperature and ease of dissolution of the particular dry polymer being used. Typically, the high shear mixing time will be approximately 2 to 5 minutes.

As the dispersed polymer and water are mixed in this high shear circulation, activation of the polymer will begin and the viscosity of the slurry will increase. The increase in viscosity will lower the flow rate of the slurry mixture through the rinsing ports 60 and dispersion ports 62. Due to the reduced rate of flow, the load on the impeller 34 decreases and the rotational speed of the impeller typically increases which indicates to the operator of the polymer activation apparatus 10 that the high speed mixing phase of the activation has been completed. However, an automatic timer mechanism can also be employed to indicate the high shear circulation stage has been completed.

Once the polymer has been properly dispersed, the hydration of the particles into the dilution water to fully activate the polymer will proceed without further agitation or mixing. However, to complete activation in this manner requires a lengthy time period. Therefore, the preferred method is to reduce the rate of circulation through the mixing assembly to create a low shear flow which speeds up the activation process.

Figure 4:
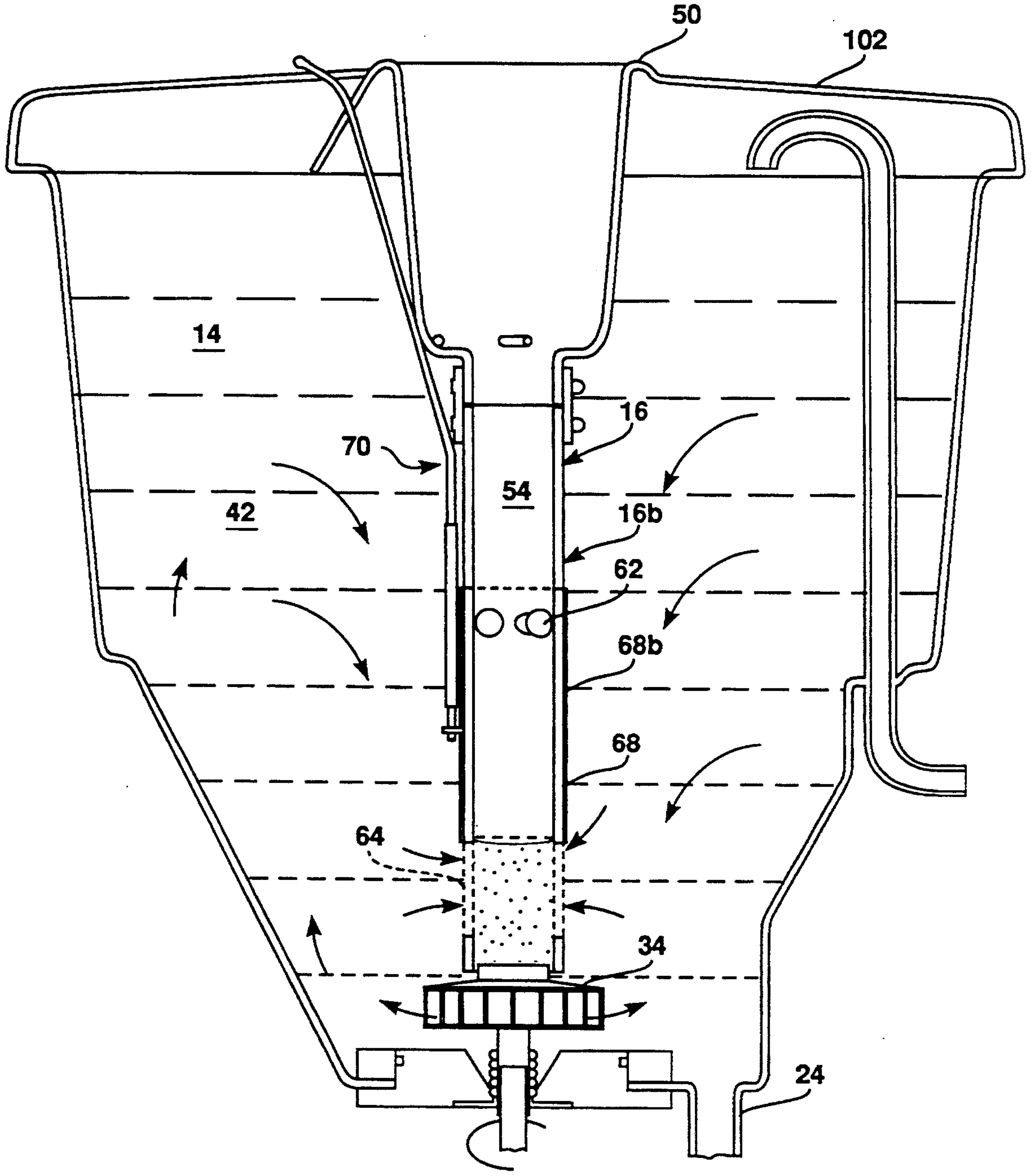

Referring to FIG. 4, to provide low shear flow, the mixing assembly 16 is placed in a mixing configuration **16*b* by positioning sleeve 68 in the mixing position 68*b* with the sleeve control linkage 70. The dispersion ports 62 are now covered and the mixing ports 64 are opened. The rotational speed of the impeller 34** is then reduced to under approximately 1000 rpm which lowers the pumping volume of the impeller.

As the impeller 34 rotates, the impeller transfers the slurry mixture from the inlet chamber 54 into the outer chamber 42. The mixture in the outer chamber 42 flows into the inlet chamber 54 through the mixing ports 64. The increase in size of the flow path through the mixing assembly 16 along with the lower pumping volume of the impeller 34, cause the vortex 112 in the inlet chamber to disappear. The mixture forms a low shear condition or spiral as the mixture moves through the tube assembly 32 and into the impeller 34.

This flowing of mixture into the inlet chamber 54, the spiral movement of mixture through the tube assembly 32 and transfer of the mixture from the tube assembly into the outer chamber 42 forms a circulation through the mixing assembly 16 and outer chamber 42 which agitates the mixture in the mixing vessel 14 to create a low shear flow. The low shear circulation speeds up the dissolution and activation of the polymer in the dilution water to form a polymer solution.

As the polymer dissolves, the solution viscosity continuously increases; however, the large cross-sectional area or flow path area of the mixing ports 64 allows sufficient flow into the impeller 34 to maintain the low shear mixing and prevent a vortex from forming in the inlet chamber 54. Such a vortex could create a high shear rate which would damage the dissolving polymer molecules.

The impeller 34 continues to rotate at the lower speed for a period of time to maintain the low shear circulation until complete dissolution and activation of the polymer has been accomplished with minimum degradation and molecular change. Typically the low shear circulation time will be approximately 15 to 30 minutes. The polymer solution is then ready for use in water treatment and may be fed directly from the mixing tank through the outlet conduit 24 at the appropriate time.

A specific embodiment of the novel dry polymer activation apparatus and method according to the present invention has been described for the purposes of illustrating the manner in which the invention may be made and used. It should be understood that implementation of other variations and modifications of the invention in its various aspects will be apparent to those skilled in the art and that the invention is not limited by the specific embodiment described. It is therefore contemplated to cover by the present invention any and all modifications, variations, or equivalents that fall within the true spirit and scope of the basic underlying principles disclosed and claimed herein.

What is claimed is:

1. A method for dissolving a measured amount of dry polymer particles batchwise in dilution water, the method comprising:

filling a mixing vessel with the dilution water to a predetermined level;

circulating the dilution water through a mixing assembly which extends downward within said vessel, said mixing assembly including a tube assembly and an impeller in fluid communication with said assembly, said circulating step including flowing the dilution water from said vessel into said mixing assembly through at least one dispersion port defined by said tube assembly and producing a high shear condition within said mixing assembly;

introducing the dry polymer into said mixing assembly;

dispersing the polymer in said dilution water to form a slurry mixture without forming significant agglomerations of the dry polymer particles;

reducing the circulation through said mixing assembly after the polymer has been dispersed into the slurry and before substantial hydration of the polymer particles has occurred, said reducing including producing a low shear mixing flow in said mixing vessel to form a polymer solution; and maintaining said low shear mixing flow as the viscosity of said polymer solution increases to fully activate said dry polymer in the dilution water without excessively damaging the polymer in said solution, whereby the dry polymer is both dispersed and activated in the same mixing vessel without forming significant agglomerations.

2. The method of claim 1 wherein said high shear producing step includes forming a vortex in an inlet chamber, said inlet chamber being defined by said tube assembly, said introducing step including placing the dry polymer into said inlet chamber.

3. The method of claim 2 wherein said tube assembly forms a plurality of said dispersion ports and said forming step includes directing said flowing through said dispersion ports, substantially tangent to the inner wall of said tube assembly to form a rotation of dilution water corresponding to a rotational direction of said impeller.

4. The method of claim 2 wherein said high shear producing step includes rotating said impeller, said rotating being about 3000 rpm.

5. The method of claim 2 wherein said high shear producing step includes forming an air passageway within said vortex.

6. The method of claim 1 wherein said maintaining step includes increasing the cross sectional area of a flow path into said tube assembly.

7. The method of claim 1 wherein said low shear producing step includes forming a low intensity spiral flow in said tube assembly.

8. A method for dissolving a batch of dry polymer in dilution water, the method comprising:

placing the dilution water in a mixing vessel;

circulating the dilution water through a mixing assembly, said mixing assembly extending within said vessel and including a tube assembly and an impeller in fluid communication with said tube assembly, said circulating step including flowing dilution water into said tube assembly through at least one dispersion ports defined by said tube assembly and forming a vortex in said tube assembly;

feeding the batch of dry polymer into said mixing assembly, said vortex directing the polymer to said impeller; and dispersing the polymer in said dilution water to form a slurry mixture.

9. The method of claim 8 wherein said tube assembly forms a plurality of said dispersion ports and said vortex forming step includes directing said flowing of dilution water through said dispersion ports, substantially tangent to the inner wall of said tube assembly to form a rotation of dilution water corresponding to a rotational direction of said impeller.

10. The method of claim 8 wherein said vortex forming step includes forming an air passageway within said vortex, said passageway extending downward near said impeller.

11. The method of claim 8 further including:

circulating said mixture through said mixing assembly a second time, said second circulating step including agitating said mixture in said vessel to create a low shear flow; and dissolving the dispersed polymer in said dilution water to form a polymer solution and fully activate said dry polymer in the dilution water without excessively damaging the polymer in said solution.

12. A method for dissolving a batch of dry polymer in dilution water, the method comprising:

placing the dilution water in a mixing vessel defined by a tank;

circulating the dilution water through a mixing assembly, said mixing assembly extending within said tank, said mixing assembly including a tube assembly and an impeller disposed below and in fluid communication with said tube assembly, said tube assembly and said tank forming an outer chamber, said circulating including, moving the dilution water through an inlet chamber defined by said tube assembly, said moving step including forming a vortex and an air passageway within said vortex, and transferring the dilution water from said inlet chamber to said outer chamber, said transferring step including rotating said impeller means, said moving step and said transferring step creating a high shear flow condition;

feeding the batch of dry polymer to said high shear flow condition;

dispersing the polymer in said dilution water to form a slurry mixture;

circulating said mixture through said mixing assembly a second time, said second circulating step agitating said mixture in said mixing vessel to create a low shear flow; and dissolving the dispersed polymer in said dilution water to form a polymer solution and fully activate said dry polymer in the dilution water without excessively damaging the polymer structures in said solution.

13. The method of claim 1 wherein said circulating step includes rotating said impeller means at a first rotational speed, said reducing step includes rotating said impeller means at a second rotational speed, said second speed being less than said first speed.

14. The method of claim 1 wherein said mixing assembly includes a plurality of said dispersion ports and an inlet chamber defined by said tube assembly, and said reducing step includes covering said dispersion ports, and discharging the slurry mixture through a plurality of mixing ports, defined by said tube assembly, into said inlet chamber.

15. The method of claim 14 wherein said inlet chamber has a generally circular cross section and defines a diameter and a first cross sectional area, a lower end of said tube assembly being located adjacent an inlet of said impeller means, said dispersion ports having a total cross sectional are of about 30% to 50% of said first cross sectional area, said dispersion ports being located in said tube assembly a distance from said inlet of said impeller means of approximately four times said diameter.

16. The method of claim 15 wherein said mixing ports have a total cross sectional area generally equal to said first cross sectional area, said mixing ports being located between said dispersion ports and said impeller means.

17. The method of claim 1 wherein said tube assembly defines a plurality of dispersion ports said circulating step includes rotating said impeller means at a first rate and discharging the dilution water flowing through said dispersion ports into an inlet chamber defined by said tube assembly, and said reducing step includes covering said dispersion ports, discharging the slurry mixture through a plurality of mixing ports, defined by said tube assembly, into said inlet chamber and rotating said impeller means at a second rate, said second rate being less than said first rate.

18. The method of claim 17 wherein said mixing assembly includes a sleeve disposed about said tube assembly, said circulating includes placing said sleeve in a first position covering said mixing ports, said reducing includes moving said sleeve to a second position covering said dispersion ports.

* * * * *